(12) United States Patent
Park et al.

(10) Patent No.: US 12,683,230 B2
(45) Date of Patent: Jul. 14, 2026

(54) BATTERY MODULE AND BATTERY PACK INCLUDING THE SAME

(71) Applicant: LG Energy Solution, Ltd., Seoul (KR)

(72) Inventors: Subin Park, Daejeon (KR); Junyeob Seong, Daejeon (KR); Won Kyoung Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 649 days.

(21) Appl. No.: 17/767,346

(22) PCT Filed: Jan. 26, 2021

(86) PCT No.: PCT/KR2021/000994
§ 371 (c)(1),
(2) Date: Apr. 7, 2022

(87) PCT Pub. No.: WO2021/206278
PCT Pub. Date: Oct. 14, 2021

(65) Prior Publication Data
US 2022/0376340 A1 Nov. 24, 2022

(30) Foreign Application Priority Data

Apr. 10, 2020 (KR) ........................ 10-2020-0043944

(51) Int. Cl.
H01M 50/244 (2021.01)
H01M 50/211 (2021.01)
H01M 50/271 (2021.01)
(52) U.S. Cl.
CPC ....... *H01M 50/244* (2021.01); *H01M 50/211* (2021.01); *H01M 50/271* (2021.01)

(58) Field of Classification Search
None
See application file for complete search history.

(56) References Cited

U.S. PATENT DOCUMENTS

2007/0141459 A1* 6/2007 Goto ................... H01M 50/213
429/88
2012/0270082 A1* 10/2012 Kim .................... H01M 50/358
429/151

(Continued)

FOREIGN PATENT DOCUMENTS

CN 103201876 A 7/2013
CN 110085900 A 8/2019

(Continued)

OTHER PUBLICATIONS

International Search Report for PCT/KR2021/000994 dated May 4, 2021. 3 pgs.

(Continued)

*Primary Examiner* — Brian R Ohara
*Assistant Examiner* — M. T. Leonard
(74) *Attorney, Agent, or Firm* — Lerner David LLP

(57) ABSTRACT

The present disclosure relates to a battery module that secures the rigidity and simplifies the structure, and a battery pack including the same. The battery module according to one embodiment of the present disclosure includes a battery cell stack in which a plurality of battery cells are stacked; a lower frame for housing the battery cell stack; an upper plate for covering an upper surface of the battery cell stack; and an end plate for covering the front and rear surfaces of the battery cell stack, wherein module mounting portions are formed at both ends of the upper plate.

7 Claims, 4 Drawing Sheets

(56)          References Cited

U.S. PATENT DOCUMENTS

| | | | |
|---|---|---|---|
| 2013/0089763 A1 | 4/2013 | Lee | |
| 2013/0288094 A1 | 10/2013 | Noh et al. | |
| 2013/0330587 A1 | 12/2013 | Takahashi et al. | |
| 2015/0004469 A1 | 1/2015 | Park et al. | |
| 2017/0305248 A1 | 10/2017 | Hara et al. | |
| 2018/0138565 A1* | 5/2018 | Lee | H01M 10/6554 |
| 2019/0067656 A1* | 2/2019 | Zhang | H01M 50/289 |
| 2019/0074490 A1* | 3/2019 | Ishimaru | H01M 50/507 |
| 2019/0131596 A1 | 5/2019 | Yang et al. | |
| 2019/0229313 A1 | 7/2019 | Lee et al. | |
| 2020/0067040 A1 | 2/2020 | Kim et al. | |
| 2020/0373542 A1 | 11/2020 | Zhang et al. | |
| 2021/0184306 A1 | 6/2021 | Baek et al. | |
| 2022/0247004 A1 | 8/2022 | Yun | |

FOREIGN PATENT DOCUMENTS

| | | | |
|---|---|---|---|
| CN | 110137391 A | 8/2019 | |
| CN | 110854319 A | 2/2020 | |
| CN | 110915019 A | 3/2020 | |
| JP | 2000223095 A | 8/2000 | |
| JP | 2012243608 A | 12/2012 | |
| JP | 2015011989 A | 1/2015 | |
| JP | 5734309 B2 | 6/2015 | |
| KR | 20130076502 A | 7/2013 | |
| KR | 20130122323 A | 11/2013 | |
| KR | 20160132143 A | 11/2016 | |
| KR | 20170035218 A | 3/2017 | |
| KR | 20170094981 A | 8/2017 | |
| KR | 20190012979 A | 2/2019 | |
| KR | 20190107900 A | 9/2019 | |
| KR | 20190129255 A | 11/2019 | |
| KR | 20200008624 A | 1/2020 | |
| KR | 20200021609 A | 3/2020 | |
| WO | 2012066875 A1 | 5/2012 | |
| WO | 2019154176 A1 | 8/2019 | |
| WO | 2020071833 A1 | 4/2020 | |

OTHER PUBLICATIONS

Search Report dated Mar. 4, 2024 from the Office Action for Chinese Application No. 202180005778.X issued Mar. 6, 2024, 2 pages.

Extended European Search Report including Written Opinion for Application No. 21784536.1 dated May 15, 2024, pp. 1-7.

\* cited by examiner

【FIG. 1】
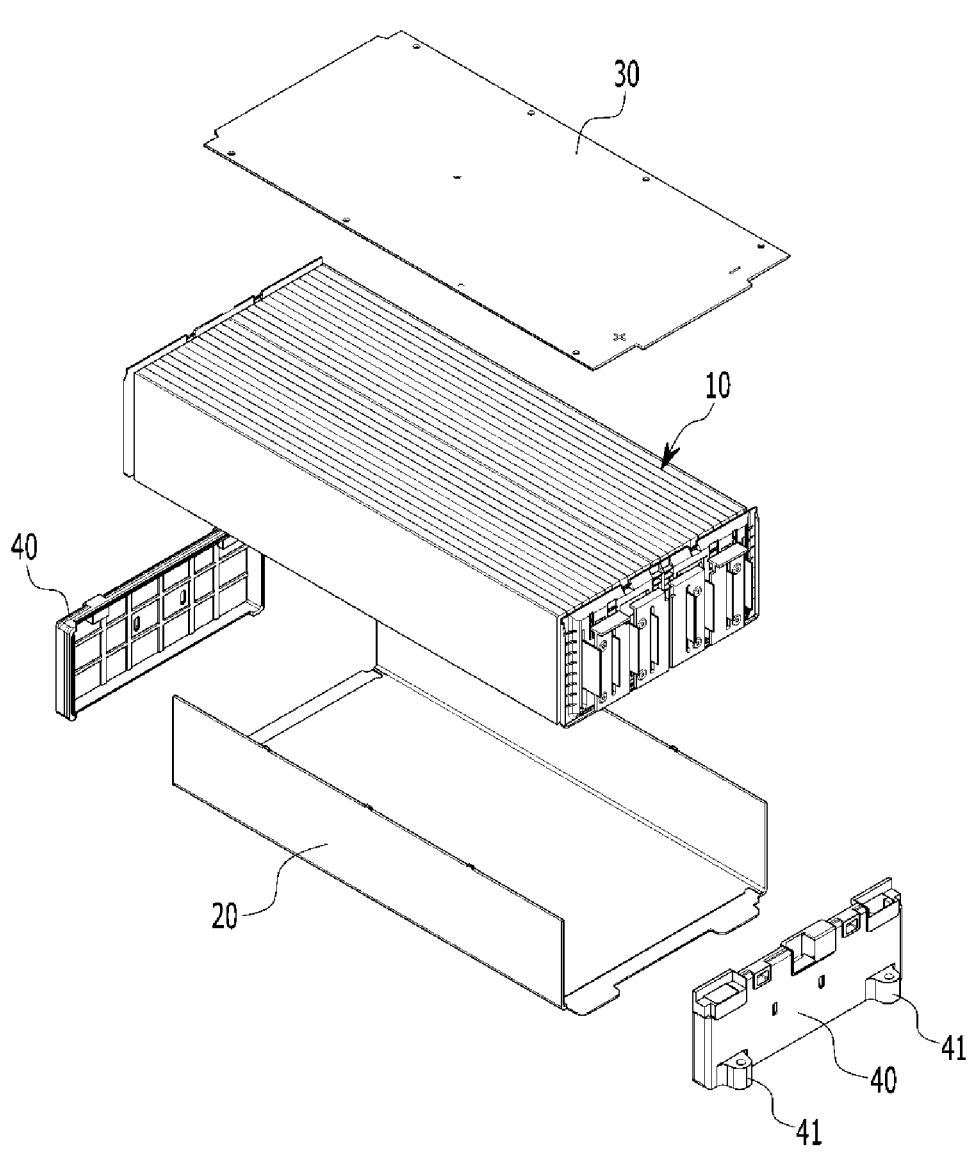

【FIG. 2】
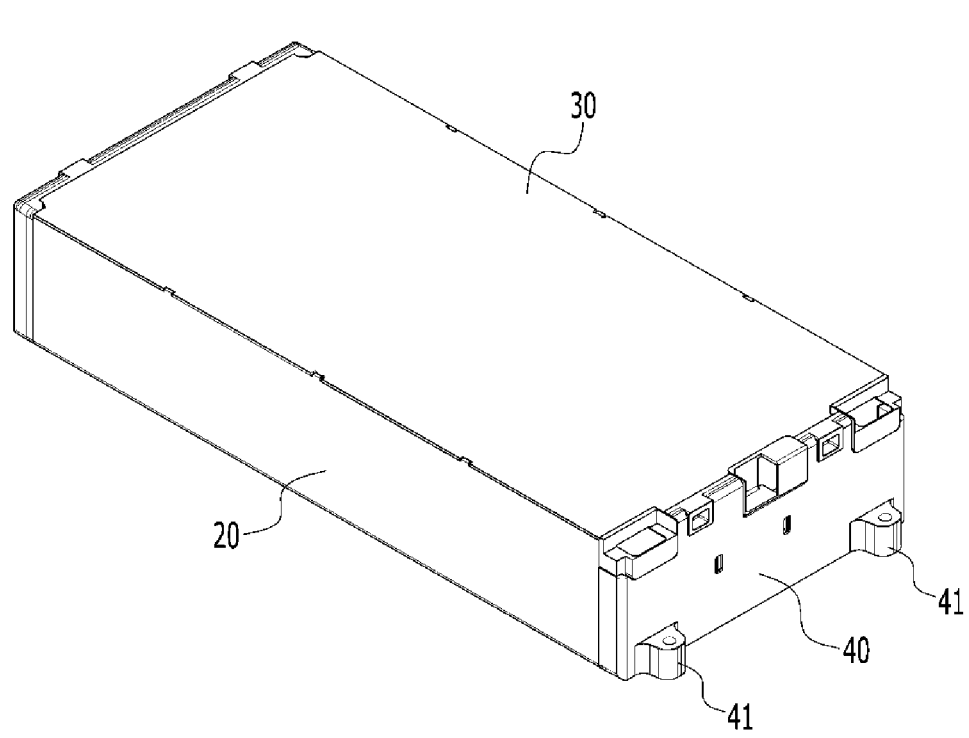

【FIG. 3】
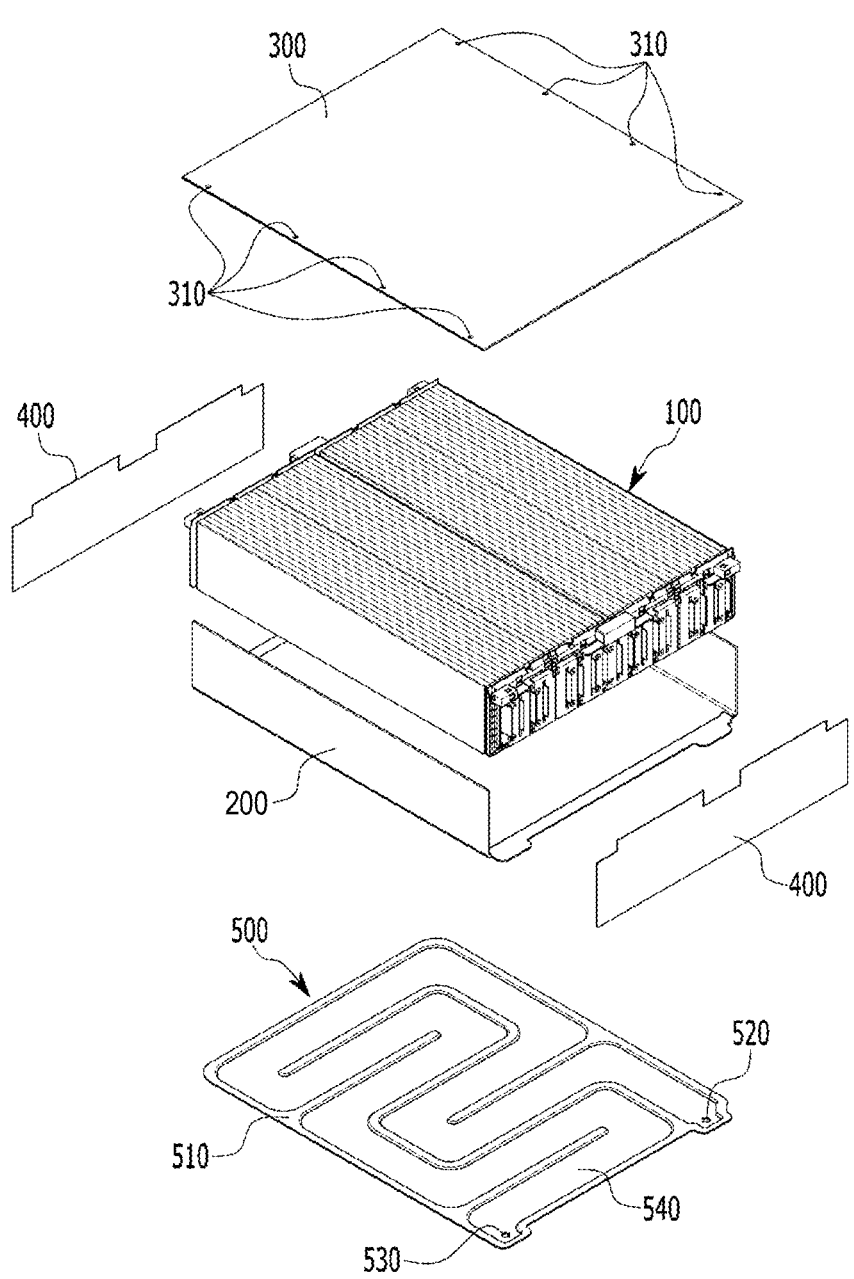

【FIG. 4】
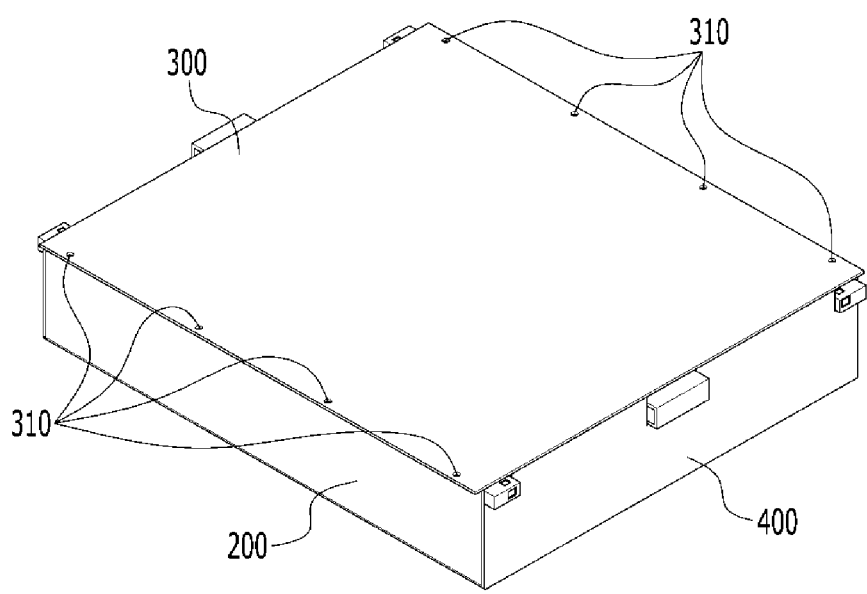
【FIG. 5】
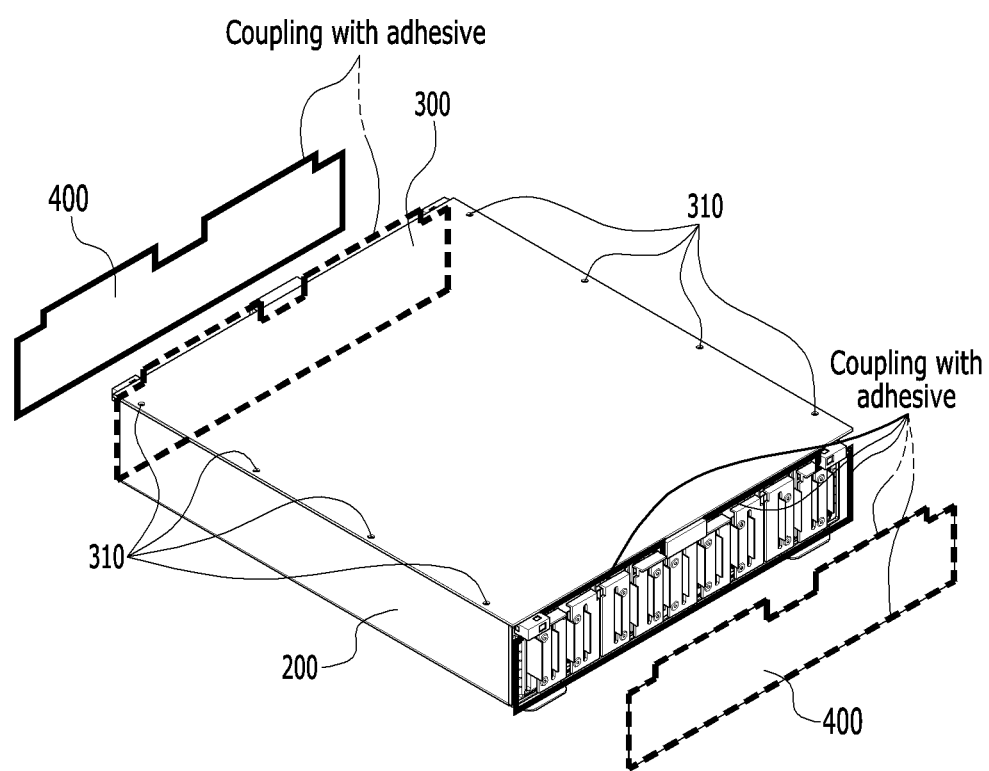

BATTERY MODULE AND BATTERY PACK INCLUDING THE SAME

CROSS-REFERENCE TO RELATED APPLICATIONS

This application is a national phase entry under 35 U.S.C. § 371 of International Application No. PCT/KR2021/000994, filed on Jan. 26, 2021, published in Korean, which claims priority to Korean Patent Application No. 10-2020-0043944, filed on Apr. 10, 2020, the entire contents of which are hereby incorporated herein by reference.

TECHNICAL FIELD

The present disclosure relates to a battery module and a battery pack including the same, and more particularly to a battery module that secures the rigidity and simplifies the structure, and a battery pack including the same.

BACKGROUND ART

A secondary battery has attracted much attention as an energy source in various products such as a mobile device and an electric vehicle. The secondary battery is a potent energy resource that can replace the use of existing products using fossil fuels, and is in the spotlight as an environment-friendly energy source because it does not generate by-products due to energy use.

Recently, along with a continuous rise of the necessity for a large-capacity secondary battery structure, including the utilization of the secondary battery as an energy storage source, there is a growing demand for a battery pack of a multi-module structure which is an assembly of battery modules in which a plurality of secondary batteries are connected in series/parallel.

Meanwhile, when a plurality of battery cells are connected in series/parallel to configure a battery pack, it is common to configure a battery module composed of at least one battery cell first, and then configure a battery pack by using at least one of the battery modules and adding other components.

Such a battery module may include a battery cell stack in which a plurality of battery cells are stacked, a frame for housing the battery cell stack, and an end plate for covering the front and rear surfaces of the battery cell stack.

FIG. 1 is an exploded perspective view showing a conventional battery module in which an upper plate and an end plate are formed. FIG. 2 is a diagram showing a state in which the disassembled components of FIG. 1 are assembled.

Referring to FIGS. 1 and 2, the conventional battery module may include a battery cell stack 10 in which a plurality of battery cells are stacked, a lower frame 20 for covering the lower surface and both side surfaces of the battery cell stack 10, an upper plate 30 for covering the upper surface of the battery cell stack 10, and an end plate 40 for covering the front and rear surfaces of the battery cell stack 10.

At this time, two module mounting portions 41 protruding from the plate surface are formed on the lower side of the end plate 40, but when a physical force such as vibration or shock of the battery module is applied, stress is concentrated on the module mounting portion 41 formed by protruding from the end plate 40. Thus, there is a risk that the module mounting portion 41 is broken from the end plate 40. Further, even when a compressive force acts on the battery module, the load is concentrated on the module mounting portion 41, and the end plate 40 connected to the module mounting part 41 receives pressure to cause deformation. Thereby, there is a risk that a short circuit phenomenon occurs between the electrode leads inside the end plate.

DETAILED DESCRIPTION OF THE INVENTION

Technical Problem

It is an object of the present disclosure to provide a battery module that can minimize the possibility of breakage through the module mounting portion, secure the physical rigidity of the battery module, and at the same time, simplify the structure.

The objects solved by embodiments of the present disclosure is not limited to the above-described objects, and other objects, which are not described above, may be clearly understood by those skilled in the art through the following description.

Technical Solution

In order to achieve the above object, the battery module according to one embodiment of the present disclosure includes a battery cell stack in which a plurality of battery cells is stacked; a lower frame for housing the battery cell stack; an upper plate for covering an upper surface of the battery cell stack; and an end plate for covering the front and rear surfaces of the battery cell stack, wherein module mounting portions are formed at both ends of the upper plate.

The end plate may be formed of an insulating member.

The end plate may be fixed to at least one of the lower frame and the upper plate by an adhesive.

The end plate may be coupled to at least one of the lower frame and the upper plate by a hook structure.

The upper plate may be protruded more than a width between both side surface portions of the lower frame, and the module mounting portion may be formed in the protruding portion.

A plurality of the module mounting portions may be formed along both side ends of the upper plate.

The module mounting portion may be formed in a hole structure.

The lower frame may include a bottom portion and side surface portions formed by bending and extending at both sides of the bottom portion.

The width of the upper plate may be wider than the gap between both side surface portions of the lower frame.

A battery pack according to another embodiment of the present disclosure includes the above-mentioned battery module.

Advantageous Effects

A battery module and a battery pack including the same according to one embodiment of the present disclosure provide the effects of minimizing the risk of breakage of the module mounting portion through a frame multipoint fixing structure via a plurality of module mounting portions formed on the upper plate, of improving the physical rigidity of the battery module, and of simplifying the structure of the battery module and reducing the weight of the battery module by using an insulating member instead of the end plate.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is an exploded perspective view showing a conventional battery module in which an upper plate and an end plate are formed.

FIG. 2 is a diagram showing a state in which the disassembled components of FIG. 1 are assembled.

FIG. 3 is an exploded perspective view showing a battery module including an upper plate and an end plate according to one embodiment of the present disclosure.

FIG. 4 is a view showing a state in which the components of FIG. 3 are assembled.

FIG. 5 is a view showing a portion in which the edge portions of the upper plate and the lower frame are coupled to the end plate by an adhesive.

DETAILED DESCRIPTION OF THE EMBODIMENTS

It should be appreciated that the exemplary embodiments, which will be described below, are illustratively described to help understand the present disclosure, and the present disclosure may be variously modified to be carried out differently from the exemplary embodiments described herein. However, in the description of the present disclosure, the specific descriptions and illustrations of publicly known functions or constituent elements will be omitted when it is determined that the specific descriptions and illustrations may unnecessarily obscure the subject matter of the present disclosure. In addition, to help understand the present disclosure, the accompanying drawings are not illustrated based on actual scales, but parts of the constituent elements may be exaggerated in size.

The terms such as first, second, and the like may be used to describe various components and the components should not be limited by these terms. The terms are used simply to distinguish one constituent element from another component.

The terms used herein are used only to describe specific exemplary embodiments, and are not intended to limit the scope of the present disclosure. A singular form may include a plural form if there is no clearly opposite meaning in the context. In this disclosure, terms such as "include", "comprises" and "have" should be understood as designating as including such features, numbers, operations, elements, components or a combination thereof in the disclosure, and not to exclude the existence or possibility of adding one or more of other features, numbers, operations, elements, components or a combination thereof.

Hereinafter, the configuration of the battery module including an upper plate according to one embodiment of the present disclosure will be described with reference to FIGS. 3 and 4.

FIG. 3 is an exploded perspective view showing a battery module including an upper plate and an end plate according to one embodiment of the present disclosure. FIG. 4 is a view showing a state in which the components of FIG. 3 are assembled.

Referring to FIGS. 3 and 4, a battery module according to one embodiment of the present disclosure includes a battery cell stack 100 in which a plurality of battery cells are stacked, a lower frame 200 for housing the battery cell stack, an upper plate 300 for covering an upper surface of the battery cell stack; and an end plate 400 for covering the front and rear surfaces of the battery cell stack 100, wherein module mounting portions 310 are formed at both ends of the upper plate 300. The lower frame 200 may have, for example, a U-shaped frame structure, wherein the lower frame 200 may include a bottom portion and side surface portions that are bent and extended on both sides of the bottom portion to cover the side surfaces of the battery cell stack 100.

The battery cell according to this embodiment is a secondary battery, and may be configured as a pouch-type secondary battery. The battery cell may be composed of a plurality of cells, and the plurality of battery cells may be stacked with each other so as to be electrically connected to each other, thereby forming a battery cell stack 100. The plurality of battery cells may include an electrode assembly, a cell case, and an electrode lead protruding from the electrode assembly, respectively.

The lower frame 200 may be formed so as to cover the lower surface and both side surfaces of the battery cell stack 100, and the upper plate 300 may be formed so as to cover the upper surface of the battery cell stack 100. Upper edges of both side surfaces of the lower frame 200 may be coupled to the lower surface of the upper plate 300. The lower frame 200 may include a bottom portion and side surface portions formed by bending and extending at both sides of the bottom portion.

The end plate 400 is formed so as to cover the front and rear surfaces of the battery cell stack 100. The end plate 400 may be coupled to the edge portions on the both sides of the upper plate 300 and the edge portions on the both sides of the lower frame 200. Through the lower frame 200, the upper plate 300, and the end plate 400, the battery cell stack 100 located inside the frame structure and the electrical components connected thereto may be physically protected.

A heat sink 500 may be formed at the lower part of the lower frame 200. The heat sink 500 may include a lower plate 510 that forms the skeleton of the heat sink and comes into contact with the bottom portion of the lower frame 200, an inlet 520 that is formed on one side of the heat sink 500 to supply refrigerant from the outside to the inside of the heat sink 500, an outlet 530 that is formed on one side of the heat sink and allows the refrigerant flowing inside the heat sink 500 to flows out of the heat sink 500, and a flow path portion 540 that connects the inlet 520 and the outlet 530 and allows the refrigerant to flow.

According to one embodiment of the present disclosure, the flow path portion 540 may refer to a structure in which the lower plate 510 in contact with the bottom surface of the lower frame 500 is recessed and formed on the lower side. The upper side of the flow path portion 540 is opened to form a flow path between the flow path portion 540 and the bottom portion of the lower frame 200, and a refrigerant can flow through the flow path. That is, the battery module according to this embodiment may be formed in an integrated cooling structure in which the heat sink 500 is coupled to the bottom portion of the lower frame 200.

Conventionally, a structure in which a refrigerant flows on the lower side of the lower frame is separately formed, so that there is no choice but to indirectly cool the module frame. Therefore, there is a problem that the cooling efficiency is lowered, a separate refrigerant flow structure is formed, and the space utilization rate on the battery module and the battery pack on which the battery module is mounted is lowered. However, according to one embodiment of the present disclosure, by adopting a structure in which the heat sink 500 is integrated at the lower part of the lower frame 200, the refrigerant can directly flow between the flow path portion 540 and the bottom portion of the lower frame 200. Thereby, the cooling efficiency due to direct cooling is increased, and the space utilization rate on the battery module and the battery pack on which the battery module is mounted may be further improved through a structure in which the heat sink 500 is integrated with the bottom portion of the lower frame 200.

According to one embodiment of the present disclosure, module mounting portions 310 may be formed at both ends of the upper plate 300. In this embodiment, the left and right widths of the upper plate 300 may be wider than the gap between both side portions of the lower frame 200. In this case, the portion in which the module mounting portion 310 is formed at the upper plate 300 may be a portion of the upper plate 300 that is more protruded outward based on the width between both side portions of the lower frame 200. A plurality of module mounting portions 310 may be formed at predetermined intervals along both side ends of the upper plate 300. The module mounting portion 310 may be formed in a hole structure. A coupling member can be inserted into the module mounting portion 310 having the hole structure to couple the battery pack frame and the upper plate 300.

Conventionally, as shown in FIGS. 1 and 2, at the lower ends of the two end plates, the module mounting portions, which are formed to be protruded in a direction perpendicular to the plate surface of the end plate, are formed two by two for each end plate. When the module mounting portions are formed two by two at the lower end of the end plate, stress is concentrated on the mounting parts of the two modules when an external force is applied, and mounting portions or end plates of the modules that are protruded and formed are broken or the end plate would be deformed. Therefore, there is a risk that a short circuit occurs between the electrode leads.

However, according to one embodiment of the present disclosure, a plurality of module mounting portions 310 are formed at both ends of the upper plate 300, and thus, the four-point fixing structure of the battery module, which was previously formed with only four module mounting portions, has been developed into a multi-point fixing structure via a plurality of module mounting portions 310 as in the present disclosure. Thereby, it is possible to improve the physical rigidity of the battery module and the battery pack combined with the battery module. Further, a fixing structure may be formed on the upper plate 300 manufactured by a press method instead of the end plate fixing structure manufactured by the existing casting method.

Hereinafter, the battery module including an end plate formed of an insulating member according to one embodiment of the present disclosure will be described with reference to FIGS. 3 and 5.

FIG. 5 is a view showing a portion in which the edge portions of the upper plate and the lower frame are coupled to the end plate by an adhesive.

Referring to FIGS. 3 and 5, the end plate 400 according to one embodiment of the present disclosure may be formed of an insulating member. Conventionally, a metal end plate formed by a casting method was used, but the end plate formed of metal is heavy, and there is a risk of breakage when stress concentration occurs.

However, according to one embodiment of the present disclosure, the end plate 400 is formed of an insulating member, so that the end plate can be molded by the injection method, whereby it has become possible to manufacture an end plate 400 that is lighter and more flexible than metal and at the same time, has insulation performance. Such an insulating member may be formed of an insulating tape, without being limited thereto, and can be formed of various types of insulating members.

Further, according to one embodiment of the present disclosure, the end plate 400 may be fixed to at least one of the lower frame 200 and the upper plate 300 by an adhesive as shown in FIG. 5. More specifically, the upper edge of the end plate 400 may be bonded to the edge portion of the upper plate 300, and both side ends and lower edges of the end plate 400 may be adhered to edge portions of the lower frame 200. The coupling method of the end plate with at least one of the lower frame and the upper plate may be performed using a hook in addition to the method using an adhesive, without being limited thereto, and various types of coupling methods may be adopted.

Conventionally, a separate fixing structure was required to couple the end plates, whereas according to one embodiment of the present disclosure, the insulating member can be fixed with an adhesive and thus, there is no need for a separate fixing structure. Therefore, since the structure of the battery module is simplified, the manufacturing process can be reduced and manufacturing cost can be reduced.

The above-mentioned battery module can be included in the battery pack. The battery pack may have a structure in which one or more of the battery modules according to this embodiment are gathered, and packed together with a battery management system (BMS) and a cooling device that control and manage battery's temperature, voltage, etc.

The battery pack can be applied to various devices. These devices may be applied to transportation means such as an electric bicycle, an electric vehicle, a hybrid vehicle, but the present disclosure is not limited thereto and can be applied to various devices that can use the battery module.

Although the preferred embodiments of the present disclosure have been illustrated and described, the present disclosure is not limited to the above-described particular embodiments, various modifications can be made by those skilled in the art without departing from the scope and spirit as disclosed in the accompanying claims, and these modifications should not be understood separately from the scope and spirit of the invention.

DESCRIPTION OF REFERENCE NUMERALS

200: lower frame
300: upper plate
310: module mounting portion
400: end plate
500: heat sink

The invention claimed is:

1. A battery pack comprising:
 a battery pack frame;
 a battery module mounted to the battery pack frame; and
 coupling members coupling the battery module to the battery pack frame,
 wherein the battery module has:
  a battery cell stack in which a plurality of battery cells are stacked, the battery cell stack having electrode leads connected to the plurality of battery cells extending therefrom in a longitudinal direction of the battery module;
  a lower frame housing the battery cell stack therein, the lower frame including a bottom portion and first and second side surface portions extending from respective opposite sides of the bottom portion and covering entire side surfaces of the battery cell stack;

an upper plate covering an upper surface of the battery cell stack; and first and second end plates covering front and rear surfaces of the battery cell stack, respectively, the electrode leads being adjacent to the first and second end plates, wherein module mounting portions are formed at opposite ends of the upper plate, the opposite ends being spaced apart from one another in a lateral direction of the battery module perpendicular to the longitudinal direction, wherein the upper plate has first and second protruding portions that each protrude in the lateral direction beyond outer surfaces of the respective first and second side surface portions of the lower frame, and the module mounting portions each have a hole structure and are formed in the first and second protruding portions at locations located beyond the outer surfaces of the respective first and second side surface portions in the lateral direction, wherein the upper plate has a constant width in the lateral direction in which the first and second protruding portions protrude between the opposite ends of the upper plate at locations having the module mounting portions and at locations not having the module mounting portions, wherein the coupling members are inserted into the module mounting portions having the hole structure to couple the upper plate to the battery pack frame, and wherein the first and second protruding portions of the upper plate do not overlap the lower frame.

2. The battery pack according to claim 1, wherein first and second pluralities of the module mounting portions are formed along the respective first and second protruding portions of the upper plate.

3. The battery pack according to claim 1, wherein the bottom portion and the side surface portions of the lower frame together form a unitary structure, each side surface portion being bent relative to the bottom portion.

4. The battery pack according to claim 1, wherein a width of the upper plate is greater than a distance between inward-facing surfaces of the opposite side surface portions of the lower frame.

5. The battery pack according to claim 1, wherein each end plate is formed of an insulating member.

6. The battery pack according to claim 5, wherein each end plate is fixed to at least one of the lower frame or the upper plate by an adhesive.

7. The battery pack according to claim 5, wherein each end plate is coupled to at least one of the lower frame or the upper plate by a hook structure.

* * * * *